United States Patent [19]

Nelson

[11] 4,317,139
[45] Feb. 23, 1982

[54] FACSIMILE APPARATUS AND METHOD OF OPERATION

[75] Inventor: Richard L. Nelson, New York, N.Y.

[73] Assignee: Exxon Research & Engineering Co., Florham Park, N.J.

[21] Appl. No.: 31,949

[22] Filed: Apr. 20, 1979

[51] Int. Cl.³ .................. H04N 1/032; H04N 1/14
[52] U.S. Cl. ................................ 358/300; 346/165; 358/303
[58] Field of Search .............. 346/139 A, 139 C, 165, 346/101, 163; 358/293, 300, 303

[56] References Cited

U.S. PATENT DOCUMENTS

| | | | |
|---|---|---|---|
| 1,871,944 | 8/1932 | Best | 346/76 R |
| 2,205,450 | 6/1940 | Wise | 358/303 |
| 2,415,229 | 2/1947 | Young | 346/165 |
| 2,421,673 | 6/1947 | Young | 358/300 |
| 2,776,337 | 1/1957 | Thompson | 358/303 |
| 3,138,426 | 6/1964 | Cooley | 346/139 A |
| 3,686,679 | 8/1972 | Stange | 346/139 A |
| 4,148,042 | 4/1979 | Mutton et al. | 346/139 A |

FOREIGN PATENT DOCUMENTS 668821 12/1938 Fed. Rep. of Germany ...... 358/303

OTHER PUBLICATIONS

Barrington et al.–Printed Circuit Writing Head for Electrochemical Printer IBM Tech. Discl. Bull., vol. 15, #3, Aug. 1972, pp. 775, 776.

Primary Examiner—Joseph A. Orsino, Jr.
Attorney, Agent, or Firm—Norman L. Norris; Dale M. Heist

[57] ABSTRACT

In a facsimile receiver, a copy medium is advanced between a platen of triangular cross-section and a plurality of stylii mounted on a moving belt. The platen is rotatable so as to allow different edges of the platen at the apices of the triangular cross-section to be placed in contact with the copy medium. In addition, the platen may be rotated to a position where a flat side of the platen is juxtaposed to the copy medium so as to allow the copy medium to be fed between the stylii and the platen during loading and unloading. The stylii are formed from sheet-like members with a broad surface in contact with the copy medium. Three such stylii are mounted on a sheet metal belt through which the stylii are electrically energized as the belt moves.

14 Claims, 9 Drawing Figures

FACSIMILE APPARATUS AND METHOD OF OPERATION

BACKGROUND OF THE INVENTION

This invention relates to a facsimile receiver which is adapted to convert electrical information-bearing signals representing information on a scanned, remotely located document into dark-light variations on a copy medium so as to form a reasonable facsimile of the scanned document.

Heretofore, it has been proposed to provide a facsimile receiver with a stylus and a platen having a straight edge which cooperates with the stylus as shown in British patent No. 1,231,258 so as to form a "pinch spot" for marking the copy medium. In order to minimize the effects of wear on the stylus, the carriage for the stylus is skewed with respect to the straight edge so that different portions of the stylus will cooperate with the straight edge to form the "pinch spot". There is no accommodation or concern for wear of the straight edge. Furthermore, there is no indication that the straight edge may be displaced with respect to the stylii so as to facilitate loading of the copy medium into the pinched spot.

U.S. Pat. No. 3,335,221—Barnes et al discloses a platen in the form of a printer bar which cooperates with a helical electrode to print on an intermediate copy medium. As noted in British patent No. 1,231,258, such a helical electrode is prone to wear even when noble metals are utilized.

SUMMARY OF THE INVENTION

In accordance with one object of this invention, a facsimile receiving apparatus is provided which is capable of a relatively long life despite the wear inherent in a stylus assembly.

In accordance with another object of this invention, a facsimile receiving apparatus is provided which may be easily loaded.

In accordance with a further object of the invention, a relatively low cost stylus assembly is provided in a facsimile receiving apparatus.

In accordance with these and other objects of the invention, a facsimile receiving apparatus comprises means for advancing a copy medium in a first direction between stylus means located on one side of the copy medium and platen means located on a second side of the copy medium. Means are associated with the copy medium for advancing the copy medium in a first direction while the stylus means is advanced in a second direction generally transverse to the first direction.

In accordance with this invention, platen means extending in the first direction comprises a plurality of edges and the platen means is rotatable so as to permit each edge to be located adjacent the copy medium and thereby permit the wear of the edges of the platen to be shared by the plurality of edges.

In accordance with another important aspect of the invention, the platen means is rotatable to intermediate positions such that a gap is created between the platen means and the stylus. This gap permits loading of the copy medium.

In a preferred embodiment of the invention, the platen is polygonal in cross-section with the edges being formed by corners of the polygonal cross-section. Preferably, the polygonal cross-section is substantially triangular.

In accordance with another important aspect of the invention, the means for advancing the stylus comprises a belt and a plurality of stylii are mounted on the belt and electrically connected thereto. Preferably, the stylii comprise sheet-like members having an elongated edge in contact with the copy medium so as to substantially overlap the edge of the platen means. In one embodiment of the invention, the stylii are riveted to the belt. In another embodiment of the invention, the stylii are lanced from the belt.

DETAILED DESCRIPTION OF A PREFERRED EMBODIMENT

Figure 1:
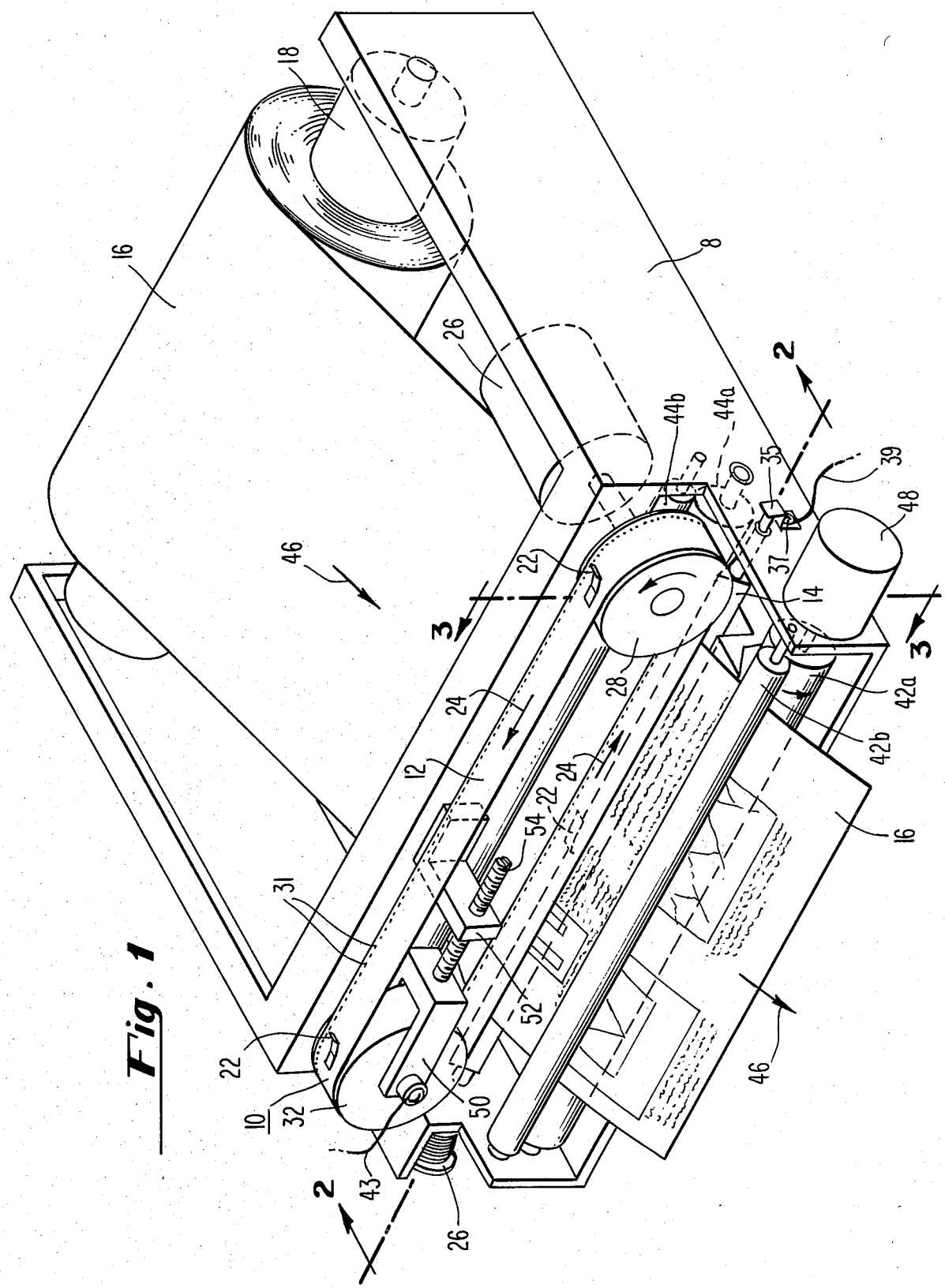
FIG. 1 is a perspective view of a facsimile receiver representing a preferred embodiment of the invention.
Figure 2:
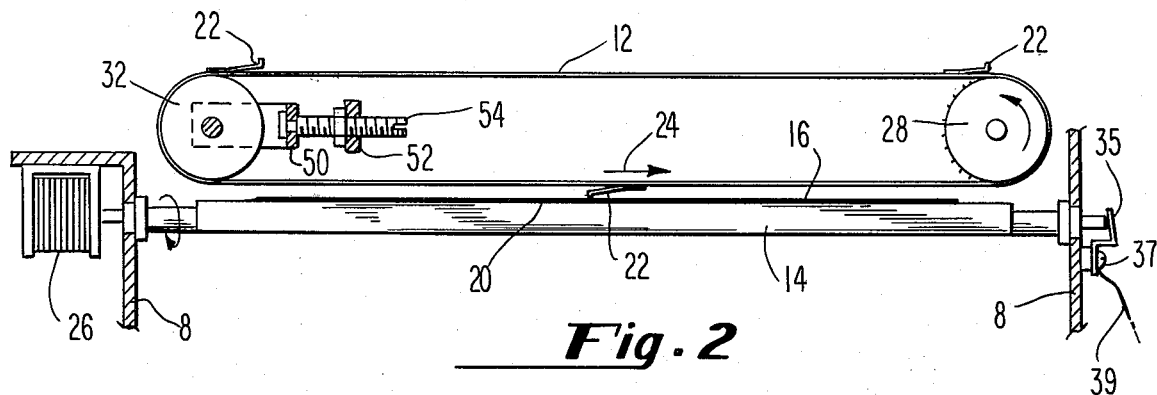
FIG. 2 is a sectional view of the facsimile receiver taken along line 2—2 of FIG. 1.

Referring to FIGS. 1 and 2, a facsimile receiver is shown including a frame 8 and stylus advancing means 10 comprising a sheet metal belt 12 forming a closed loop and a platen 14 mounted on the frame 8. The stylus advancing means 10 is located on one side of a copy medium 16 supplied from a roll 18 and the platen 14 is located on the other side of the copy medium 16.

Figure 3:
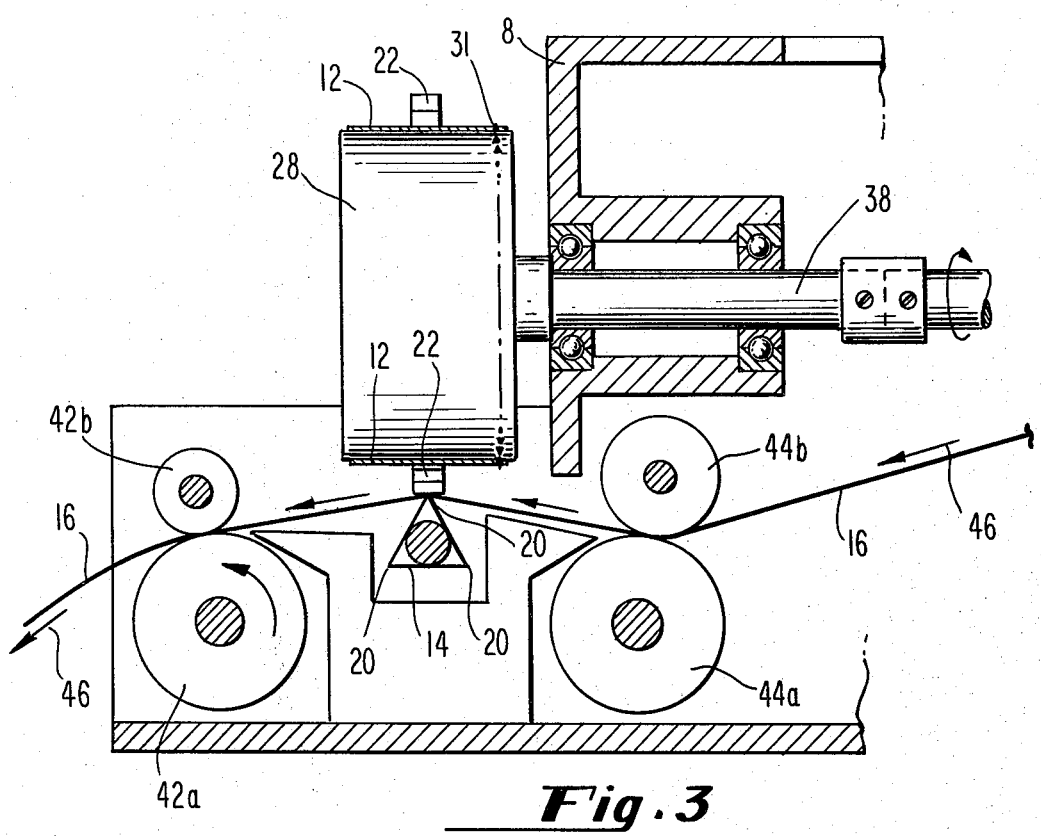
FIG. 3 is a sectional view taken along line 3—3 of FIG. 1 with the platen in the writing position.
Figure 4:
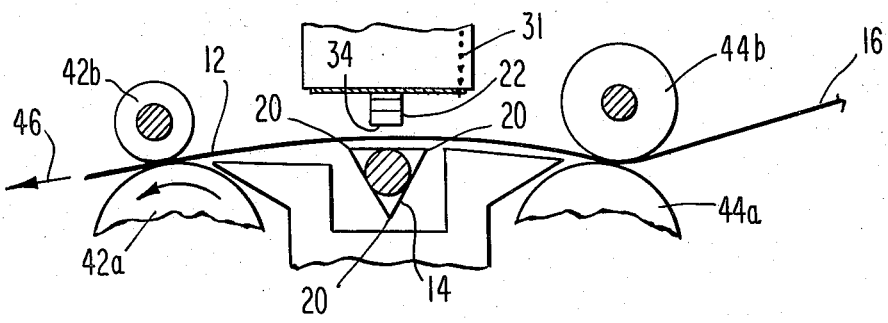
FIG. 4 is a view similar to FIG. 3 with the platen in the copy medium loading position.

In accordance with this invention, the platen 14 is substantially polygonal in cross-section as shown in FIGS. 3 and 4, so as to form a plurality of edges 20. Each of the edges 20 is adapted to be in contact with the copy medium 16 along a line generally corresponding to the path traversed by a plurality of stylii 22 mounted on the belt 12 as the belt 12 traverses a path indicated by arrows 24 as shown in FIGS. 1 and 2.

In accordance with another important aspect of the invention, the platen 14 is rotatable through a plurality of positions so as to permit each of the edges 20 to be in contact with the copy medium 16 as shown in FIG. 3. At the same time, the platen 14 may be rotated to intermediate positions such that the flat side of the platen 14 is juxtaposed to the stylii 22 of the belt 12 thereby permitting free movement of the copy medium 16 through the gap between the platen 14 and the stylii 22 as shown in FIG. 4. Rotation of the platen 14 may be accomplished by a rotary solenoid 26 as shown in FIGS. 1 and 2.

In order to permit writing on the copy medium 16 in successive lines as the copy medium 16 is advanced, the belt 12 is driven at one end by a motor 26 which is coupled directly to a sprocket 28 throgh a shaft 30 and the teeth of the sprocket 28 engage holes 31 in the belt 12. A second idling sprocket 32 is provided at the other end of the closed loop of the belt 12. The belt 12 comprises three different stylii 22 equally spaced around the closed loop formed by the belt 12 so as to permit one of the stylii 22 to contact the copy medium 16 at substantially all times.

Figure 5:
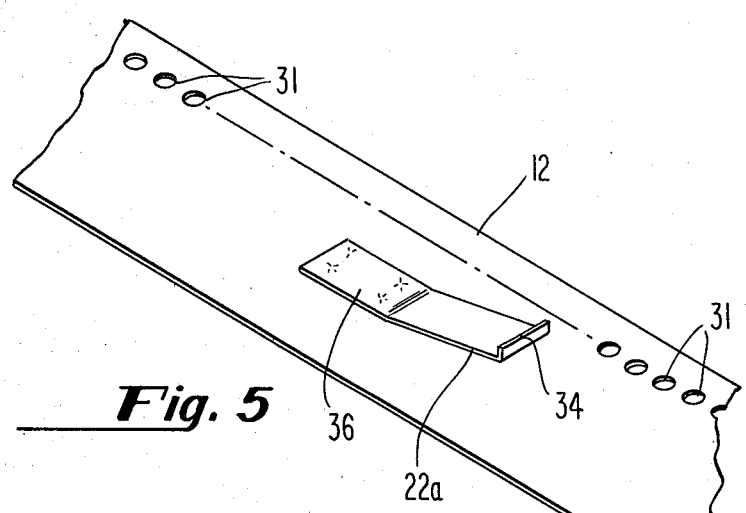
FIG. 5 is a perspective view of a portion of the stylus belt showing one embodiment of the invention.
Figure 6:
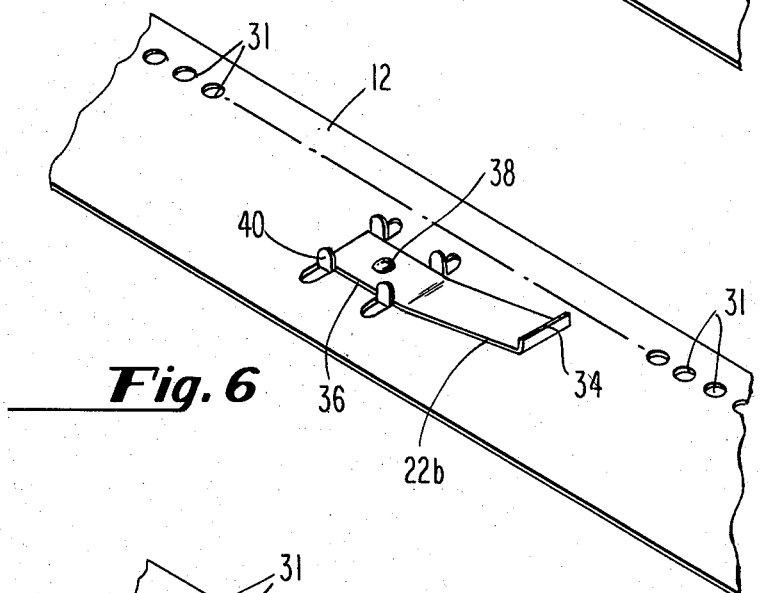
FIG. 6 is a perspective view of the stylus belt in another embodiment of the invention.
Figure 7:
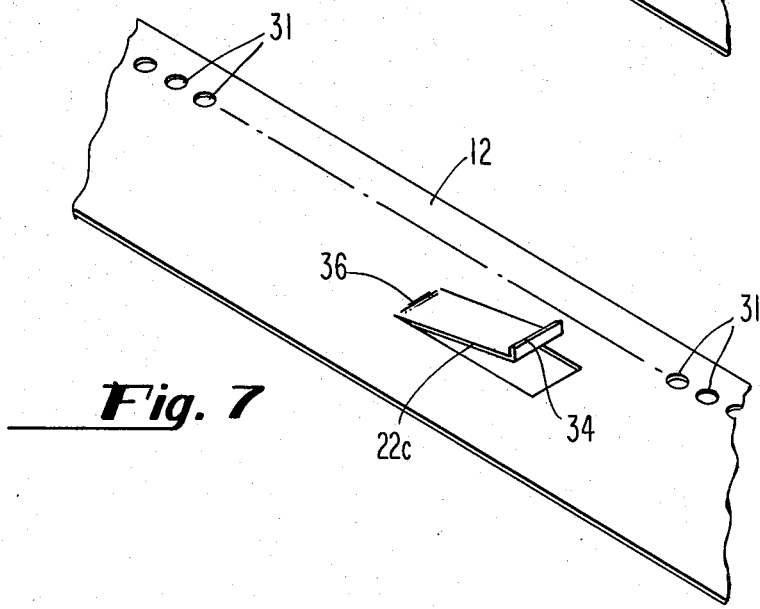
FIG. 7 is a perspective view of the stylus belt in yet another embodiment of the invention.

As will be best appreciated with reference to FIGS. 3 and 5-7, energization of the stylii 22 through the conductive sheet metal belt 12 will produce a mark on the copy medium 16 of a size substantially defined by the area between the edge 20 of the platen 14 and an edge 34 of the stylii 22. As shown in FIGS. 5-7, the edge 34 is elongated and the critical dimension in determining the size of the mark on the copy medium is the width of the stylii edge 34 as well as the width of the edges 20 on the platen 14. It will be understood that the maximum dimension of the mark substantially corresponds to the minimum dimensions of the edge 20 and the edge 34. Of course, the edge 34 of the stylii 22 will substantially overlap and extend beyond the edges 20 of the platen 14. The platen 14 which may be mounted in the frame 8 in insulated bearings 33 is contacted at one end by a brush 35 secured by a fastener 37 which may be connected, for example, to ground as depicted by a wire 39 as shown in FIGS. 1 and 2.

As also shown in FIGS. 5-7, each of the stylii 22(a-c) comprise a sheet-like member which is secured to the sheet metal belt 12. As shown in FIG. 5, the stylus 22a is welded to the belt 12 at one end 36. This particular embodiment permits the stylus 22a to be formed from a material dissimilar to the belt 12. For example, the stylus 22 may be formed from molybdenum so as to provide a wear resistant edge 34 whereas the belt 12 may comprise a suitable metal such as stainless steel.

In FIG. 7, the stylus 22c has been actually lanced from the belt 12 and remains integrally hinged to the belt 12 at the end 36. In the embodiment of FIG. 6, the stylus 22b is secured to the belt 12 by a rivet 38. In order to maintain the stylus 22b in the proper position on the belt 12, integral, lanced tabs 40 may be provided on opposite sides of the stylus 22b.

Referring again to FIGS. 1, 3 and 4, pairs of copy medium rollers 42(a & b) and 44(a & b) are provided for moving the copy medium between the platen 14 and the stylii 22 in a direction indicated by arrows 46. A motor 48 is coupled directly to the roller 42a so as to provide a copy medium drive.

In order to provide tension on the belt 12, the sprocket 32 is rotatably mounted on a yoke 50. The yoke 50 is movably mounted with respect to a reference bracket 52 by a bolt 54 which may be advanced or retracted depending on the tension requirements. A circuit path for energization of the stylii 22 is completed through a wire 43 connected to the sprocket 32.

Figure 8:
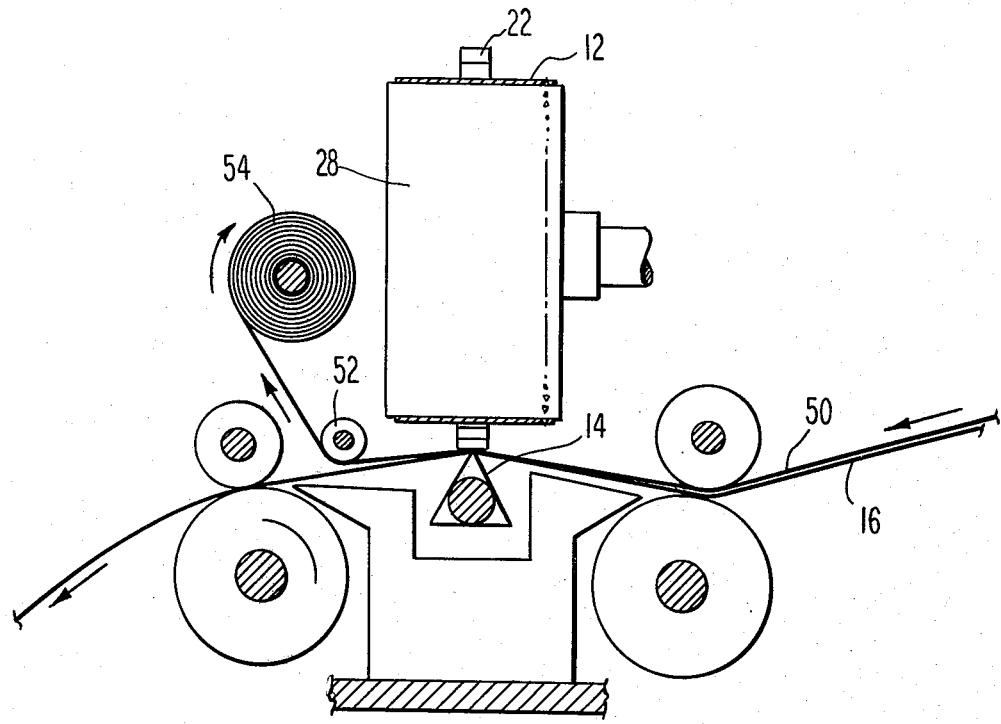
FIG. 8 is a sectional view of another embodiment of the invention.
Figure 8A:
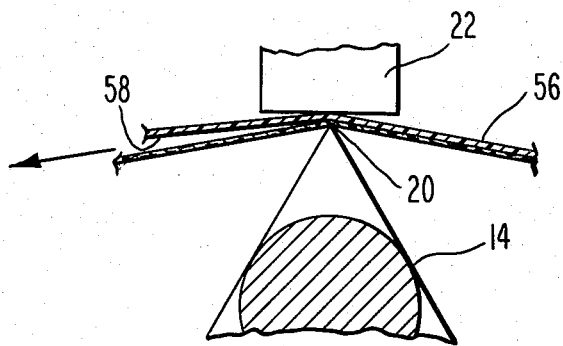
FIG. 8a is an enlarged view of a portion of FIG. 8.

In the embodiment shown in FIGS. 8 and 8a, the same reference characters are utilized to identify the same element as shown in the embodiments of FIGS. 1-7. Additional reference characters are utilized to designate elements which have no counterpart in the embodiments of FIGS. 1-7.

As shown in FIG. 8, a web of electrostatic carbon paper 50 moves between rollers 44a and 44b in juxtaposition to the copy medium 16 such that the electrostatic carbon paper 50 and the copy medium are in substantial contact at an edge 20 of the platen 14. After the electrostatic carbon paper 50 passes the platen 14, the paper 50 contacts a tension roller 52 prior to being accumulated in a take-up roll 54. It will be understood that a supply roll not shown in FIG. 8 may be advantageously utilized.

In the embodiments shown in FIG. 8, the electrostatic carbon paper 50 which may be of the type sold by the Sekisui Chemical Company of Osaka, Japan comprises a substantially conductive surface 56 which is juxtaposed to the stylii 22. A pigment carrying side 58 is juxtaposed to the copy medium 16 which may, in the embodiment of FIGS. 8 and 8a, comprise any material including a plain bond type of paper. As the stylus 22 is energized, the pigment from the carbon paper 50 on side 58 thereof is transferred to the copy medium 16. It will be appreciated that the copy medium 16 of the embodiments of FIGS. 1-7 is of a different type where energization of the stylus 22 actually creates a mark on the copy medium 16 itself due to pigmentation carried by the copy medium 16. Although the electrostatic carbon paper 50 has been described as supplied from or taken up on rolls, it will be understood that the paper 50 might form an endless loop which would facilitate reuse of the paper 50.

In the preferred embodiment of the invention, the platen 14 is substantially triangular in cross-section with the edges 20 being located at the apices of the triangular. However, it will be appreciated that other polygonal cross-sectional configurations may be utilized to provide a plurality of edges for contact with the copy medium while still permitting a gap to be created between the stylus and the platen for loading purposes.

The belt 22 may comprise stainless steel. The belt may also comprise other conductive materials such as copper which may be somewhat more resistant to belt breakage.

The apparatus disclosed herein may employ suitable receiver circuitry such as that disclosed in U.S. application Ser. No. 606,506 which is incorporated herein by reference.

Although particular embodiments of the invention have been shown and described, and various modifications suggested, it will be appreciated that other embodiments and modifications will fall within the true spirit and scope of the invention as set forth in the appended claims. For example, the invention has been described in terms of a receive only apparatus. However, it could also be employed in a transceiver.

What is claimed is:

1. A facsimile apparatus for producing a copy at one location of a document at another location comprising: means for advancing a copy medium in a first direction; stylus means located on one side of the copy medium; means for advancing the stylus means in a second direction;
platen means extending in said second direction on the other side of said copy medium, said platen means being triangular in cross-section and having a plurality of edges, said platen means being stationary during the advancement of said stylus in said direction so as to form a pinch spot between one of said edges and said stylus, said platen means being rotatable after said advancement so as to individually and selectively locate each of said edges adjacent said stylus.

2. The apparatus of claim 1 wherein said platen means is rotatable to intermediate positions wherein a gap is created between said platen means and said stylus means.

3. The apparatus of claim 1 further comprising a web of pigment carrying material in contact with said copy medium at said stylus means for transferring said pigment to said copy medium upon stylus energization.

4. The apparatus of claim 1 wherein said stylus means includes a stylus edge overlapping and extending substantially beyond the edge of said platen in contact with said copy medium.

5. The apparatus of claim 1 wherein said stylus advancing means comprises a belt forming a closed loop and said stylus means are carried by said belt.

6. The apparatus of claim 5 wherein said belt comprises sheet-like metal and said stylus means are electrically coupled to said belt.

7. The apparatus of claim 5 wherein said stylus means comprises a plurality of stylii spaced along said belt.

8. The apparatus of claim 7 wherein said stylii comprise sheet-like members.

9. The apparatus of claim 8 wherein said stylii are riveted to said belt.

10. The apparatus of claim 8 wherein said stylii are lanced from said belt.

11. The apparatus of claim 8 wherein said stylii are welded to said belt.

12. A method of operating a facsimile apparatus comprising the following steps:

traversing a copy medium with a stylus along a path on one side of said medium;

locating one edge of a platen having a plurality of edges so as to contact the copy medium with said edge on the other side of said copy medium along a line generally corresponding to the path traversed by the stylus along said copy medium, during said traversing, said platen being triangular in cross-section with the edges being formed by corners of said triangular cross-section; and thereafter rotating said platen to intermediate positions such that areas between said edges are juxtaposed to said path and spaced from said copy medium so as to discontinue said contact and to allow loading of said copy medium.

13. The method of claim 12 including the step of energizing said stylus so as to produce a mark on the copy medium having a maximum dimension substantially corresponding to the minimum dimension of said edges of said platen.

14. The method of claim 12 including the step of passing a pigment-carrying web between the stylus and the copy medium for transferring said pigment from the web to the copy medium.

* * * * *